(12) United States Patent
Fan et al.

(10) Patent No.: US 11,382,368 B2
(45) Date of Patent: Jul. 12, 2022

(54) SOFT ROBOTIC FABRICS AND METHODS FOR SAME

(71) Applicant: Cornell University, Ithaca, NY (US)

(72) Inventors: Jintu Fan, Hong Kong (HK); Dahua Shou, Ithaca, NY (US); Yan Cui, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 16/445,182

(22) Filed: Jun. 18, 2019

(65) Prior Publication Data
US 2019/0380399 A1    Dec. 19, 2019

Related U.S. Application Data

(60) Provisional application No. 62/686,642, filed on Jun. 18, 2018.

(51) Int. Cl.
| | | |
|---|---|---|
| *A41D 13/005* | (2006.01) |
| *A41D 1/00* | (2018.01) |
| *A41D 31/06* | (2019.01) |
| *B32B 5/02* | (2006.01) |
| *B32B 7/12* | (2006.01) |
| *B32B 25/10* | (2006.01) |
| *B32B 27/32* | (2006.01) |
| *B32B 3/08* | (2006.01) |
| *B32B 3/26* | (2006.01) |
| *B32B 5/26* | (2006.01) |
| *B32B 5/30* | (2006.01) |
| *B32B 7/023* | (2019.01) |
| *B32B 7/05* | (2019.01) |
| *B32B 7/08* | (2019.01) |
| *B32B 25/12* | (2006.01) |
| *B32B 27/08* | (2006.01) |
| *B32B 27/12* | (2006.01) |
| *B32B 27/28* | (2006.01) |
| *B32B 27/30* | (2006.01) |
| *B32B 7/00* | (2019.01) |

(Continued)

(52) U.S. Cl.
CPC ............ *A41D 13/005* (2013.01); *D06N 7/00* (2013.01); *D06N 2203/066* (2013.01); *D06N 2205/20* (2013.01); *D06N 2209/065* (2013.01); *D06N 2211/10* (2013.01)

(58) Field of Classification Search
None
See application file for complete search history.

(56) References Cited

U.S. PATENT DOCUMENTS

| | | | | |
|---|---|---|---|---|
| 4,242,869 A | * | 1/1981 | Sakazume | B60T 11/16 60/594 |
| 6,918,140 B1 | * | 7/2005 | Cooper | A41D 1/084 2/228 |

(Continued)

FOREIGN PATENT DOCUMENTS

| | | | | |
|---|---|---|---|---|
| WO | WO 2018/009164 A1 | * | 1/2018 | ............ A61M 5/145 |
| WO | WO 2018204688 A1 | * | 11/2018 | ............ A41D 1/002 |

*Primary Examiner* — Frank J Vineis
*Assistant Examiner* — Nicole T Gugliotta
(74) *Attorney, Agent, or Firm* — Hodgson Russ LLP

(57) ABSTRACT

An embodiment of a robotic fabric has a first fabric layer and an actuator that is configured to have a first state and a second state. A property of the first fabric layer is different when the actuator is in the first state as compared to the property of the first fabric layer when the actuator is in the second state.

13 Claims, 13 Drawing Sheets

(51) Int. Cl.
*B32B 25/18* (2006.01)
*D06N 7/00* (2006.01)

(56) References Cited

U.S. PATENT DOCUMENTS

| | | | |
|---|---|---|---|
| 10,159,351 B1* | 12/2018 | Alexander | A47C 7/32 |
| 10,299,520 B1* | 5/2019 | Shaffer | H05B 3/347 |
| 2008/0201818 A1* | 8/2008 | Nilforushan | A61F 7/02 |
| | | | 2/69 |
| 2016/0263751 A1* | 9/2016 | Galloway | B25J 9/142 |

* cited by examiner

SOFT ROBOTIC FABRICS AND METHODS FOR SAME

CROSS-REFERENCE TO RELATED APPLICATIONS

This application claims priority to U.S. Provisional Application No. 62/686,642, filed on Jun. 18, 2018, the disclosure of which is incorporated herein by reference.

FIELD OF THE DISCLOSURE

The present disclosure relates to fabrics, and in particular fabrics with actively controllable characteristics.

BACKGROUND OF THE DISCLOSURE

Clothing fabric, which may be thought of as a second skin, plays a substantial role in the thermal comfort of the wearer. Fabrics which can effectively manage the skin microclimate will significantly improve both the comfort and the protection of the wearer. There is a long-felt need for fabrics with the ability to adapt to thermal conditions in order to provide comfort and protection in varying environments.

In cold climates, high thermal insulation clothing is essential for human beings. In the past, our concept of thermal filling materials was limited to natural materials, such as down feather, cotton, wool, and cashmere. In fact, it is not the nature of the materials used but the stay air layer created by these materials that plays the role of insulation. With the convergence of fabric technology, lamination technology, and welding technology, air has been used as the filler in recent years instead of the traditional thermal insulator. Inflatable garments were traditionally as air jackets or protection suits, another one uses thermoplastic film as an inflatable material with the membrane inflatable technology. As most of the inflatable structures are a piece of continuous air paths, the garments contain a large area of unbreathable structure, influencing moisture vapor transmission. In addition, the inelastic plastic film used in the inflatable structure cannot fit human body well after inflation, reducing wear comfort.

Traditional down jackets are lightweight with good thermal performance, but they have many shortcomings. First, their thermal insulation property is reduced after laundering for many times, and dry cleaning adds extra cost. Second, the fluffy down feather or cotton in these traditional thermal garments may be unappealing. Third, animal protectionists and environmentalists may find the use of feathers in these garments to be controversial.

Researchers have been working hard to develop new insulation materials to replace the traditional thermal materials. The existing insulation clothing have the following categories:

Electric heated clothing: These clothing are usually made by either graphene composite fibers, carbon fiber elements, or metal heating wires. However, graphene composite fibers are not an ideal type of material due to their poor sensitivity, limited stretchability, and unreliable stability of strain. Similarly, the other traditional conducting wires can't be washed.

Thermal clothing with aerogel composites: Aerogel's extremely low density and low thermal conductivity allow it can be used as a thermal material for clothing. Unfortunately, because of its friability and poor mechanical strength, aerogel has some limitations. Thus, the present research mainly focuses on enhancing the mechanical performance of aerogel, reducing material costs and extending the service life of aerogel.

Thermal clothing with thermal-sensitive phase change material (PCM): First, in order to have a significant thermal-regulation effect, a lot of PCM or PCM microcapsules need to be attached to the clothing. However, the more PCM there are, the heavier the clothing is, which may be burdensome to the wearer. Second, the phase transition of thermal-sensitive PCM needs to be activated by a significant temperature difference, restricting its application conditions.

Thermal clothing with shape memory materials (SMMs): Clothing made by SMMs has shortcomings with respect to its thickness and stiffness. Also, SMMs are identical to PCM that they rely on a large temperature difference to change phase. Moreover, SMMs are expensive, resulting in high manufacturing costs.

Inflatable thermoregulation clothing: This type of clothing increases the thickness of the stable air layer between surface fabric and lining to promote insulation. One type of inflatable clothing is fabricated by double airtight layers, and it will form several airbags after inflation. Another type of inflatable clothing contains two structures: an outer layer and a liner consisted with airbags. The airbags serve as the internal filling structure in this type of clothing. Since all of these inflatable structures use airtight materials, they have poor moisture-penetrability of the garment. In addition, these inflatable structures are unbendable after full inflation.

BRIEF SUMMARY OF THE DISCLOSURE

The present disclosure provides fabrics with the ability to actively facilitate the thermal management of the skin microclimate—i.e., opening pores of the fabric when hot or closing pores when cold and windy, increasing an air gap between fabric layers to improve thermal insulation in cold environment, transporting sweat liquids directionally from the skin side of the fabric to the outside when the wearer is sweating, etc.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

In one aspect, the present disclosure provides a soft robotic fabric having one or more actuators which can deform to change the properties of the fabric such that thermal characteristics of the fabric can be actively managed. The actuators may be soft robotic parts made from soft and/or deformable materials such as, for example, silicone, plastic, fibers, and rubber. The actuators may be conformably attached to, or incorporated into or between, one or more fabric layers. The actuators may have one or more hollow chambers for receiving fluids such as, for example, air or liquids. In this way, the actuator may be actuated by injection or removal of fluid. The actuators may comprise components configured to be non-uniform in order to provide a desired deformation. For example, an actuator may comprise more than one component, each having an elastic modulus which is different that of another component. In this way, the components will respond differently to the injection or removal of fluids. For example, a curved actuator may be configured with a first component along the outside of the curve and a second component along the inside of the curve, and the first component may have a low elastic modulus relative to the second component. In this way, injecting fluid into the actuator may cause the first component to stretch more than the second component, thereby decreasing the radius of the curve.

Figure 1:
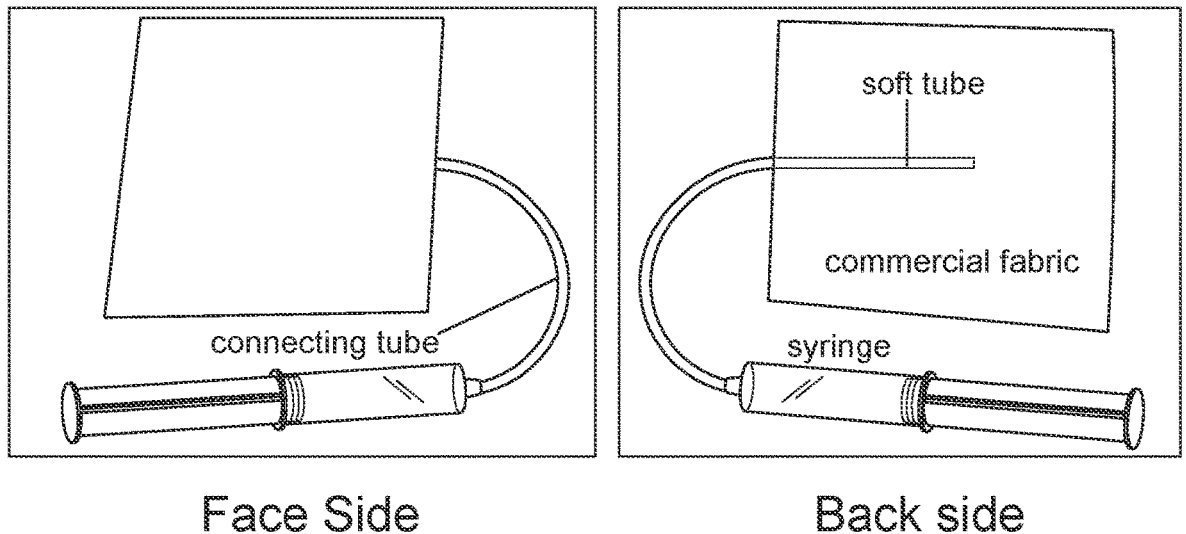
FIG. 1 is an illustration of several exemplary soft robotic fabric according to embodiments of the present disclosure.
Figure 1:
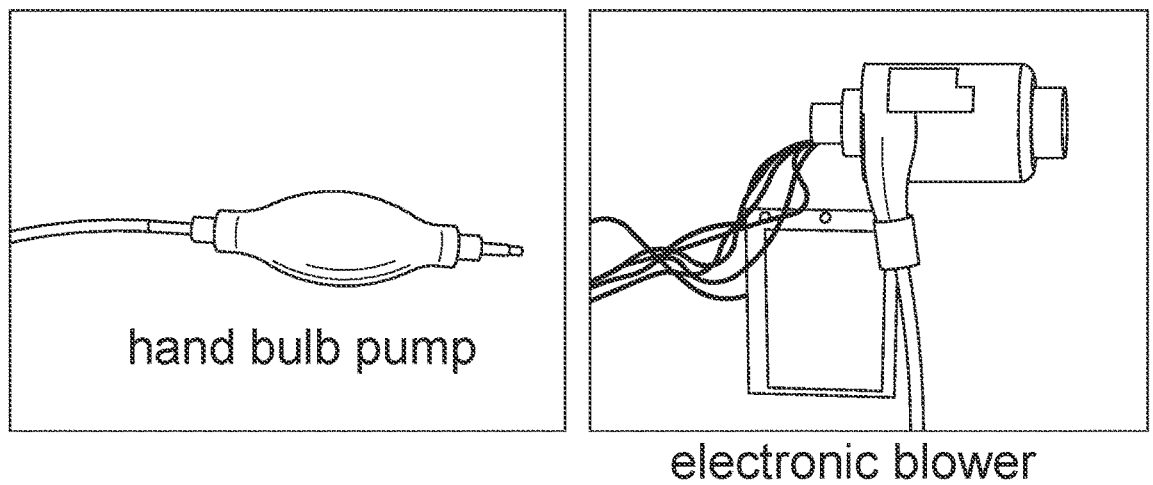

The deformation of the actuator(s) drives the action of the whole fabric system, such as bending, twisting, elongating, and opening or closing of holes in the fabric. The pumping of fluids (injection or removal) can be done manually—i.e., a person may control the fluid (e.g., a manual pump, a manually-energized electronic pump or blower, etc.) The pumping of fluids can be done automatically, for example, in response to a wearer's thermal status. In some embodiments, the control of fluid can be done both manually and automatically. The fluid used for the actuator(s) may be any suitable fluid, such as a gas (e.g., air, etc.) or liquid (e.g., water, glycol, etc.) FIG. 1 depicts several exemplary embodiments showing where fluid can be injected by syringe, bulb pump, and electronic blowers.

The present disclosure may be embodied as a robotic fabric. In some embodiments, the robotic fabric has a first fabric layer. The fabric layer can be woven, knitted, braided, or nonwoven or other configurations of fabrics as are known in the art. In some embodiments, the fabric layer may be (or include) a membrane, a microporous membrane, a nanoporous membrane, and/or a monolithic sheet material. In some embodiments, the robotic fabric has an actuator with at least two actuation states—a first state and a second state. It should be noted that while reference is made herein to actuators having a first state and a second state, such actuators may have additional actuation states including, without limitation, intermediate states between the first state and the second state. The actuator is configured to alter a property of the first fabric layer. As such, a property of the first fabric layer is different when the actuator is in the first state as compared to the property of the first fabric layer when the actuator is in the second state.

Figure 7A:
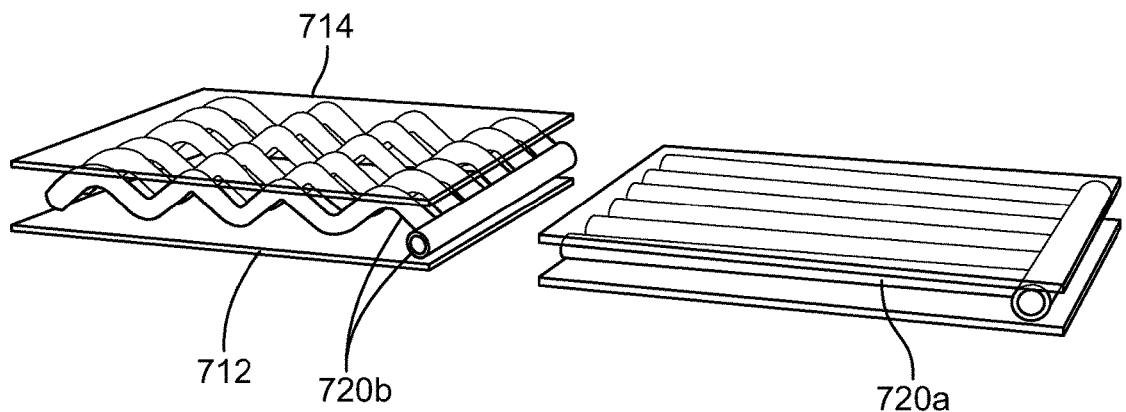
FIGS. 7A and 7B depict an embodiment of a robotic fabric having a plurality of actuators between two fabric layers under not actuated (left) and actuated (right) conditions.
Figure 7B:
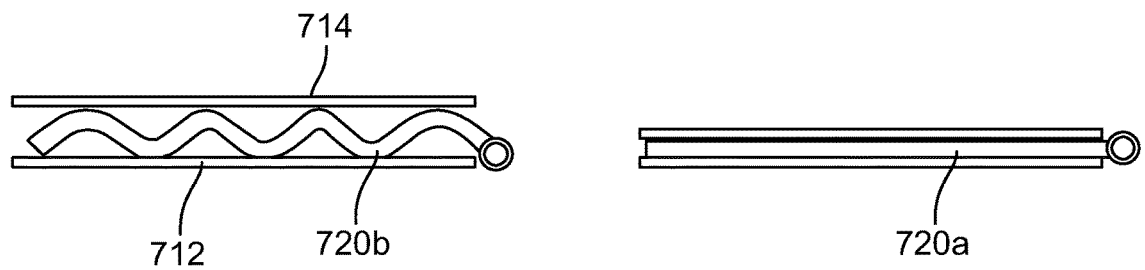

In some embodiments, the robotic fabric includes a second fabric layer. In such embodiments, the actuator may be disposed between the first fabric layer and the second fabric layer. The actuator may be configured to alter a distance between the first fabric layer and the second fabric layer. In this way, the property of the first fabric layer that is altered by the actuator is the distance from the second fabric layer. For example, in the embodiment depicted in FIGS. 7A and 7B, a plurality of actuators are provided which have a straight configuration in a first state (actuators 720*a* at right side of the figures) and a zig-zag pattern in a second state (actuators 720*b* at the left side of the figures). As such, a distance between the first fabric layer 712 and the second fabric layer 714 may be greater when the actuators are in the second state than the distance between the first fabric layer 712 and the second fabric layer 714 when the actuators are in the first state. The distance between fabric layers may be within any range found to be suitable for such fabrics. In some embodiments, the distance between fabric layers may be between 0 mm and 10 mm when in the first state and between 0.5 mm and 100 mm when in the second state (inclusive, and including all values between such ranges, including 0.1 mm increments).

Figure 2:
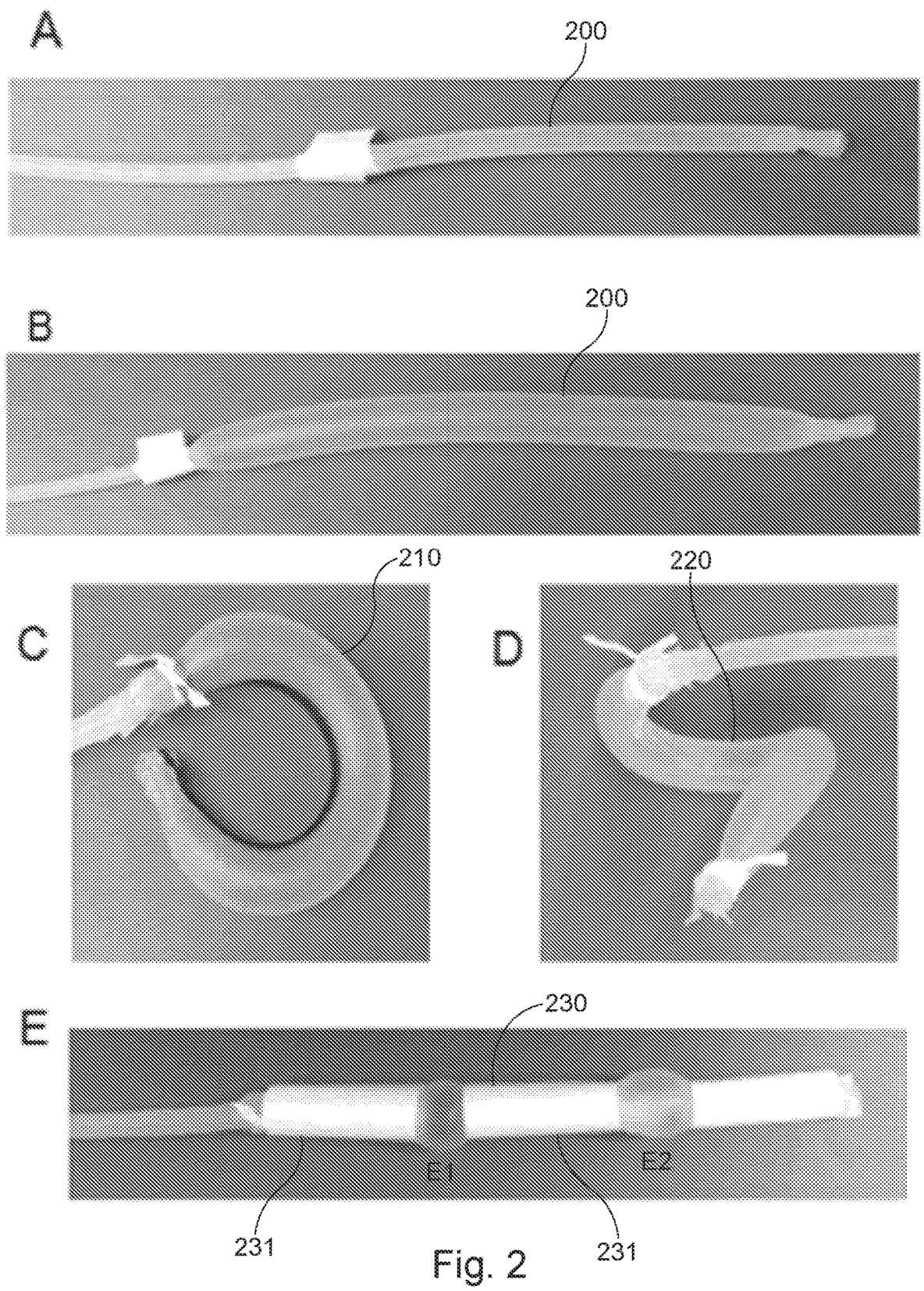
FIG. 2 is an illustration of basic deformation modes of various exemplary actuators suitable for the present disclosure—(2A) no deformation (original); (2B) uniform deformation; (2C) bending; (2D) twisting; and (2E) local deformation (such as bending or expansion). Here, 2E may reduce the deformation (e.g., bending) of the whole fabric system to maintain the appearance and wearability of a garment made from the fabric.

In some embodiments having at least two fabric layers, the distance between a first fabric layer and a second fabric layer may be altered by a change in a thickness of the actuator or a portion of the actuator. For example, FIGS. 2A and 2B show an actuator 200 where the thickness (in this non-limiting example, measured as a diameter of the tubular actuator 200) has been increased in a second state (FIG. 2B) from the thickness in the first state (FIG. 2A). FIG. 2E shows an exemplary actuator 230 where the thickness has been increased at two locations—'E1' and 'E2'—along a length of the actuator 230. In some embodiments, the distance between a first fabric layer and a second fabric layer may be altered by a change in a length of an actuator or a portion of the actuator. In some embodiments, the distance between the first fabric layer and the second fabric layer may be altered by a change in an amount of twist of at least a portion of the actuator (see, for example, the twist in the spiral-shaped actuator 220 of FIG. 2D).

Figure 4:
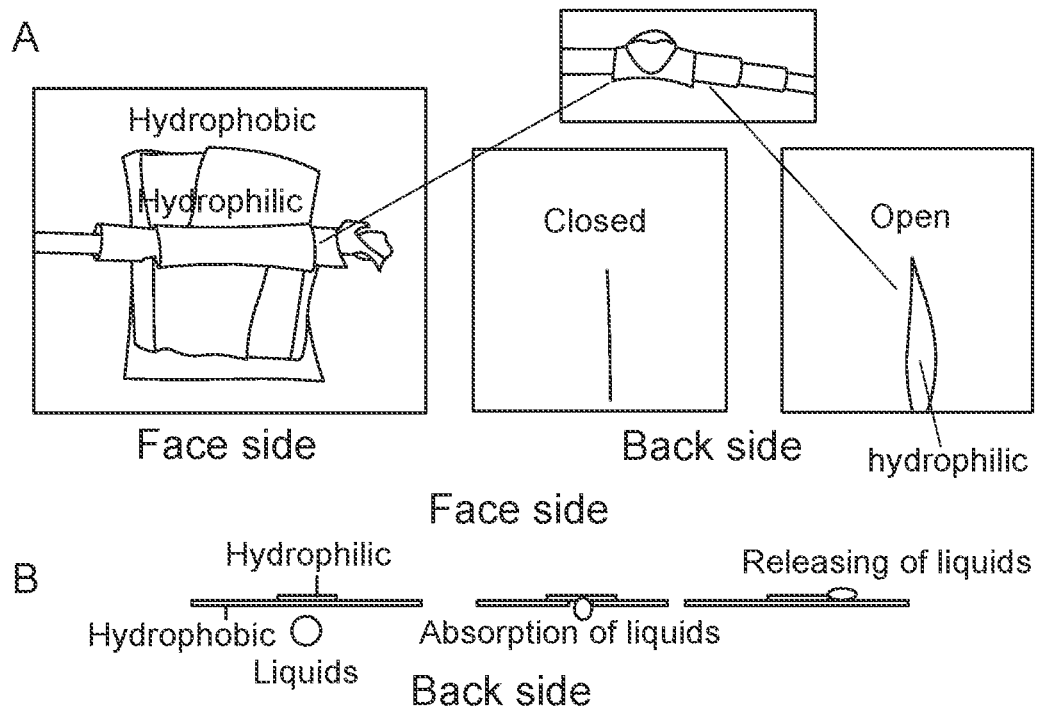
FIG. 4 depicts an embodiment of a robotic fabric configured for directional liquid transfer.
Figure 5:
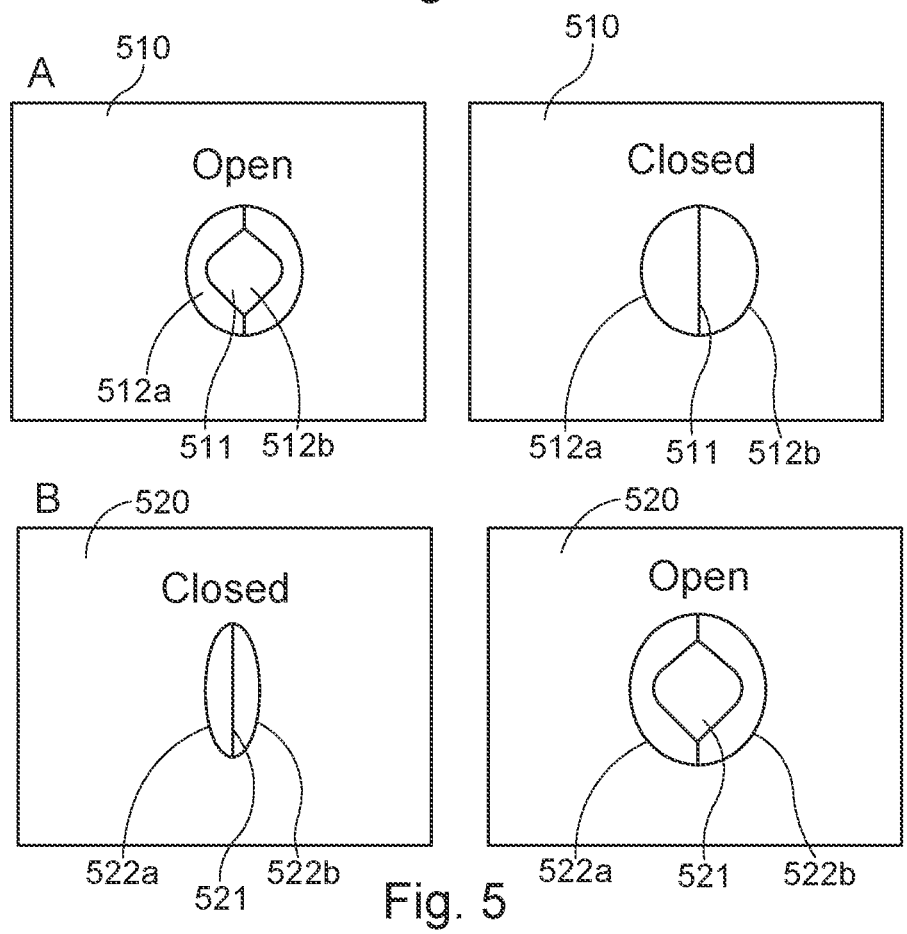
FIG. 5 depicts an embodiment of a robotic fabric having stomata-like micro-pores.
Figure 6:
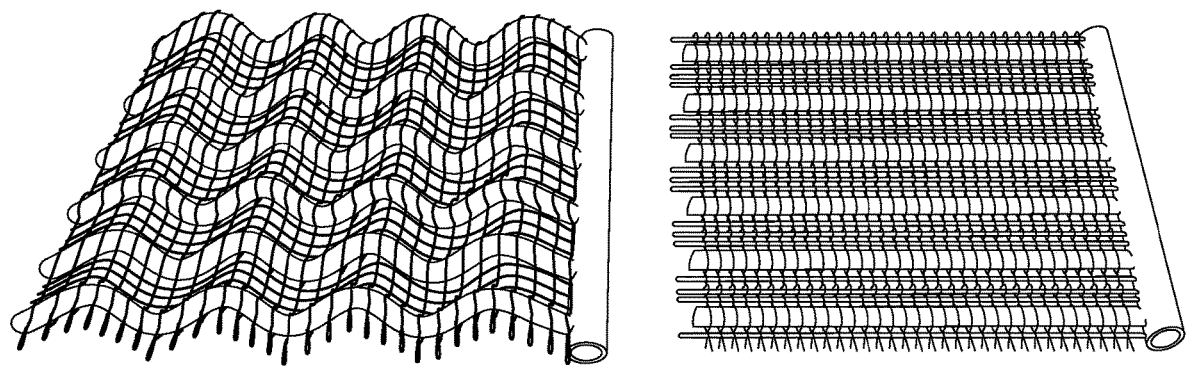
FIG. 6 depicts an embodiment of a robotic fabric having a plurality of actuators embedded in a fabric layer under not actuated (left) and actuated (right) conditions.

In some embodiments, a first fabric layer of a robotic fabric is hydrophobic. Examples of hydrophobic materials are PTFE, etc. The contact angle of water on such hydrophobic materials is between 90 and 180 degrees. The robotic fabric may include a second fabric layer which is hydrophilic. Examples of hydrophilic materials include cotton, viscose rayon, linen, shaped polyester (e.g., COOLMAX®), etc. The contact angle of water on such materials is between 0 and 90 degrees. The second layer may be an outer (face) layer of a garment and the first layer may be an inner (back) layer. The first fabric layer may include one or more holes. One or more actuators may be used to open and close the holes of the first fabric layer (see, for example, FIGS. 4 and 5). For example, the one or more holes of the first fabric layer may be closed when the actuator is in the first state and open when the actuator is in a second state, thereby exposing the hydrophilic outer layer to the wearer. In this way, water may be wicked away from the wearer when the holes are opened by the actuator. In an exemplary embodiment depicted FIGS. 4A and 4B, when the holes in a first fabric layer are open, liquids at a back side of a first fabric layer can be contacted and absorbed by a flexible hydrophilic strip attached to the face side of the fabric. Then, the collected liquids can be released to environment on the face side after the holes are closed. The hydrophobic surface of the face side may facilitate the releasing of the liquids of the hydrophilic strip.

Figure 3:
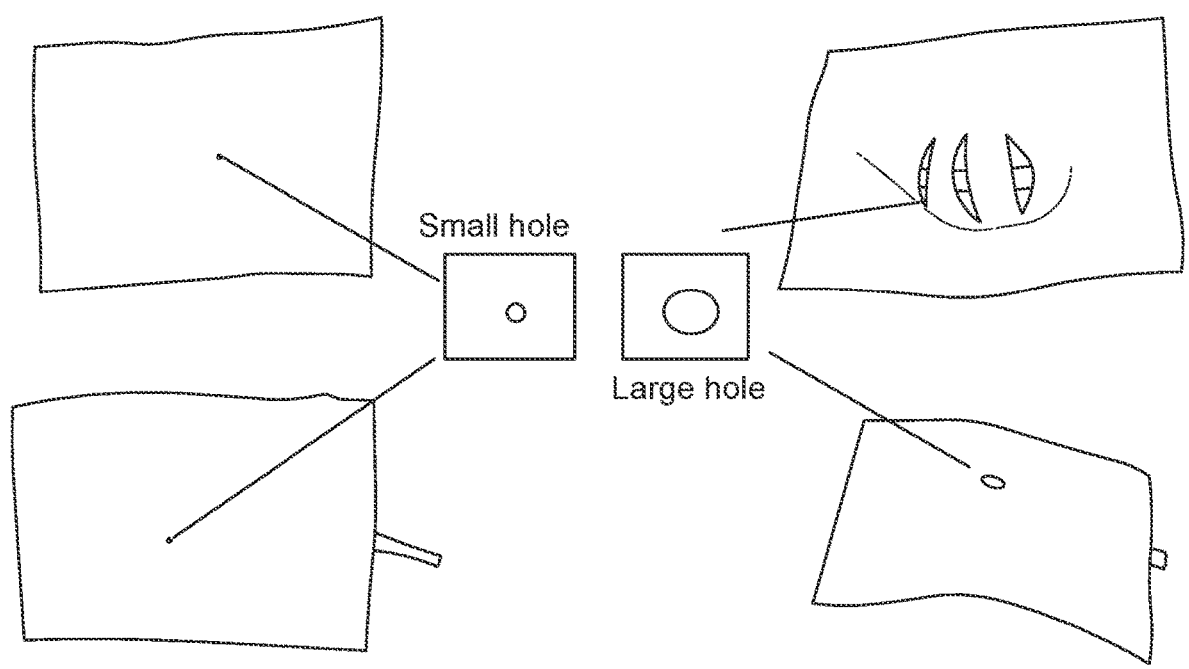
FIG. 3 depicts an embodiment of a robotic fabric for altering air penetration and vapor diffusivity. The size of holes of the fabric layer can be enhanced or reduced by the actuator, responding to the environment conditions and human requirements.

In some embodiments, the first fabric layer of a robotic fabric comprises one or more pores, and the actuator is configured to increase or decrease the size of the one or more pores according to a state of the actuator. Pores may be of any suitable size. For example, in some embodiments, pore size is between 0 and 1 mm when in a first state and 0.1 mm and 50 mm when in a second state (inclusive, and including all values between such ranges, including 0.1 mm increments). For example, FIG. 3 depicts an exemplary embodiment where the actuator is disposed through the one or more pores of the first fabric, and the pore size will increase (when the actuator thickness is increased) or decrease the pore size (when the actuator thickness is decreased).

In some embodiments wherein the first fabric layer has pores or holes, the actuator may be disposed around the circumference of each pore or hole. The actuator has a first curvature (see, for example, actuator 210 in FIG. 2C) when in the first state and a second curvature, which is less than the first curvature, when in the second state. As such, a size of each pore or hole is increased as the curvature of the actuator decreases. In some embodiments wherein the first fabric layer has pores or holes, a robotic fabric has a second actuator, and the first and second actuators are configured to cause the one or more pores to be closed when the actuators are in the first state, and to cause the one or more pores to be open when the actuators are in the second state. For example, the first and second actuators may have a straight configuration in the first state such that the actuators are in contact with each other along their respective lengths to close the pore (or hole). When the actuators are moved to the second state, a curvature in each will cause the pores (holes) to open. For example, in FIG. 5B, two actuators 522a, 522b have a first state with a generally straight configuration wherein a hole on an attached fabric 520 is closed (left figure) and a second state wherein the actuators 522a, 522b have an increased curvature whereby the hole 521 of the fabric 520 is pulled open.

In another embodiment shown in FIG. 5A, two actuators 512a, 512b are attached to a fabric 510 such that a hole 511 is open when the actuators 512a, 512b are in a first state. When the actuators 512a, 512b are expanded into a second state, the fabric 510 is pulled such that the hole 511 is closed.

The actuator or actuators of the present disclosure may be made from one or more pliable materials such as, for example, elastomers, natural rubber, butyl rubber, polychloroprene, nitrile, polyethylene, PVC, etc. The actuator may be made from a composite material such as, for example, a fiber-reinforced material, a particle-filled material, a film-embedded material, or combinations of these or other composite materials. FIG. 2E shows an example wherein an actuator 230 includes one or more portions 231 made from a rigid material for restraining portions of the actuator 230. Embodiments of the robotic fabric may comprise more than one actuator. Where more than one actuator is used, the actuators may be similarly configured (e.g., made from the same material, configured to have similar actuation states, etc.), the actuators may be differently configured, or combinations of similar and dissimilar actuators. Although several examples described herein describe the use of two actuators, all examples are intended to be non-limiting and the embodiments may be implemented with more than two actuators. For example, the embodiments depicted in FIGS. 5A and 5B may be implemented using more than two actuators for each hole/pore.

Embodiments of the fabrics described herein may have any hole configuration. For example, in the various embodiments, a hole may be considered closed when a diameter of the hole is less than a diameter of the hole when open. In another example, a hole may be considered closed when the fabric is such that the hole prevents all or substantially all of a liquid to pass through. In another example, a hole may be formed by a slit in the fabric. In another example, a hole may be formed by more than one intersecting slits in the fabric. In another example, a hole may be formed by a removed (e.g., punched, cut-out, etc.) portion of the fabric. In another example, a hole may be formed by a weave pattern of the fabric. Unless otherwise notes, the terms holes, pores, and voids have similar meaning.

Actuators may be configured such that adding or removing fluid from an interior chamber of the actuator will alter a physical characteristic (i.e., property) of the actuator. In some embodiments, the fluid is a gas, such as, for example, air, argon, carbon dioxide, etc. In some embodiments, the fluid is a liquid, such as, for example, water, etc. For example, an actuator may be configured such that at least a portion of the actuator has a first thickness when in the first state and a second thickness when in the second state. See, for example, FIGS. 2A and 2B. The thickness of the actuator may be any value suitable for the particular application. For example, the thickness of the actuator may be between 0 and 10 mm when in a first state and between 0.5 and 100 mm in a second state (inclusive, and including all values between such ranges, including 0.1 mm increments). In some embodiments, thickness may refer to an outer dimension (e.g., outer diameter, etc.) of the actuator. For example, in FIG. 2A, the actuator 200 has a first-state thickness (e.g., outer diameter of the tubular actuator shape) that is thinner than that of the actuator 200 in the second state (FIG. 2B).

In another example, an actuator may be configured such that at least a portion of the actuator has a first amount of twist when in the first state and a second amount of twist when in the second state. The twist of the actuator may be any value suitable for the particular application. For example, the twist of the actuator may be between 0% and 50% when in a first state and between 1% and 99.9% in a second state (inclusive, and including all values between such ranges, including 0.1 percentage point increments). See, for example, FIG. 2D.

In another example, an actuator may be configured such that at least a portion of the actuator has a first length when in the first state and a second length when in the second state. The length of the actuator may be any value suitable for the particular application. For example, the length of the actuator may be between 0 and 5,000 mm when in a first state and between 2 and 10,000 mm in a second state (inclusive, and including all values between such ranges, including 0.1 mm increments).

In another example, an actuator may be configured such that at least a portion of the actuator has a first curvature when in the first state and a second curvature when in the second state. The curvature of the actuator may be any value suitable for the particular application. For example, the curvature of the actuator may be between 0 and 20 (l/m) when in a first state and between 0.0001 and 1,000 (l/m) in a second state (inclusive, and including all values between such ranges, including 0.1 mm increments).

In some embodiments, a robotic fabric may further comprise a sensor, and the state of the actuator may be determined according to a signal from the sensor. The sensor may be configured to measure any desired parameter (or more than one parameter) such as, for example, temperature and/or humidity. The robotic fabric may further include a processor in electronic communication with the sensor and the actuator. In this way, the processor may be programmed to drive the actuator according to a signal received from the sensor. In an exemplary embodiment, a garment may be made using a robotic fabric according to the present disclosure, and a sensor may be used to monitor a temperature of the wearer. If the temperature of the wearer increases (e.g., the sensor may be provided between the skin of the wearer and the inner layer of the robotic fabric), the robotic fabric may be reconfigured to be less insulating. For example, the distance between fabric layers may be increase or pores of a fabric layer may be closed. Similarly, if the temperature of the wearer decreases, the robotic fabric may be reconfigured to be more insulating.

The robotic fabric may further include a pump, such as a hand pump, blower, syringe, etc. See, for example, FIG. 1. The fabric may further include one or more tubes fluidically coupled between the pump and the actuator. The tube may be made from any material, thought it may be advantageous to use soft, pliable materials for the tube.

In an embodiment of the present disclosure, the fabric layers may be silicone layers. For example, the silicone layers may be Ecoflex™00-30 or Ecoflex™00-50. The space between the silicone layers may define an air path that may be inflated/deflated to become more/less insulating.

Figure 17A:
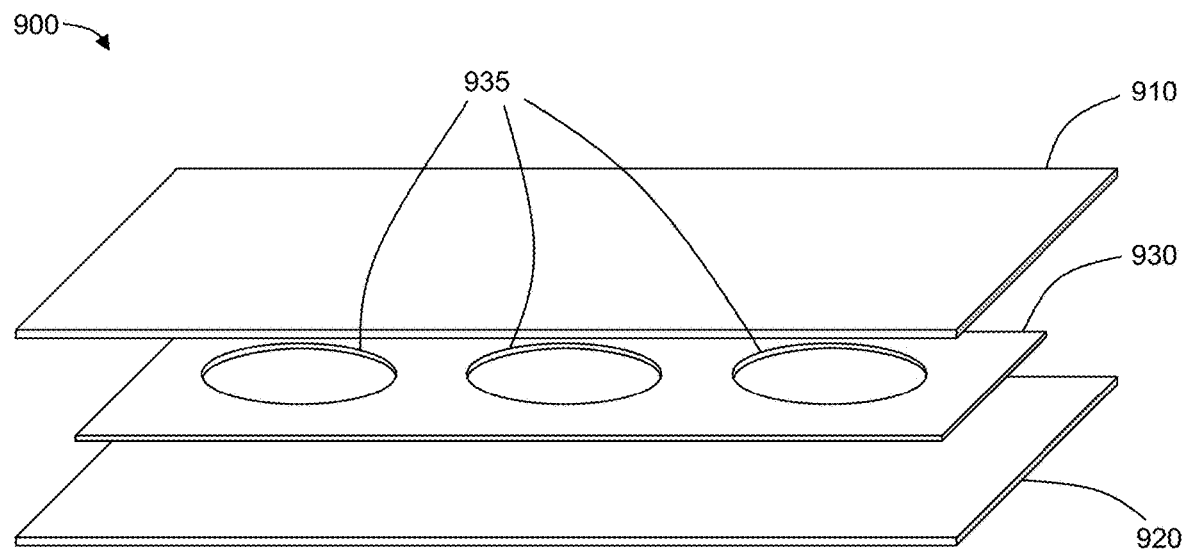
FIG. 17A is an exploded view diagram of a robotic fabric according to another embodiment of the present disclosure.
Figure 17B:
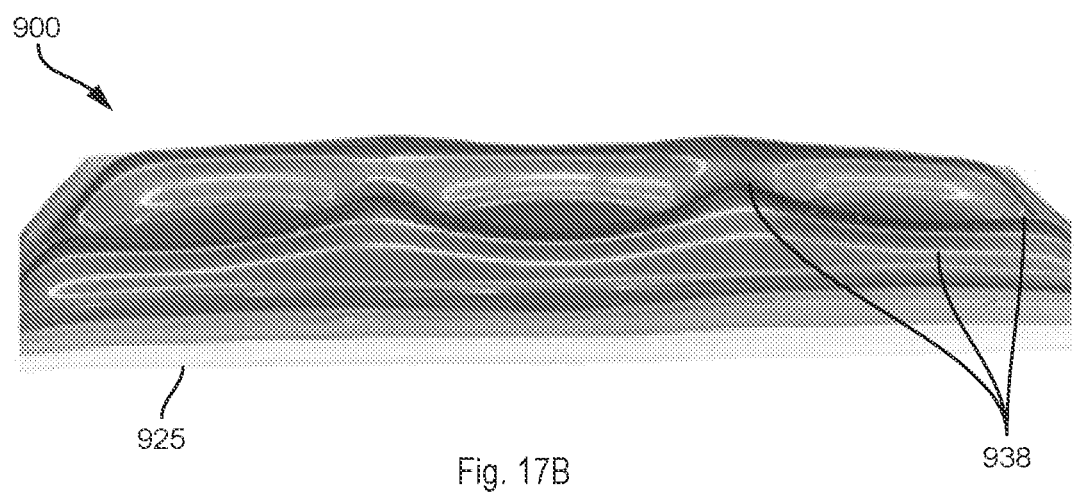
FIG. 17B depicts the robotic fabric of FIG. 17A in an inflated state.

With reference to FIGS. 17A and 17B, in another aspect, a robotic fabric 900 has a first layer 910 (i.e., a first fabric layer) and a second layer 920 (i.e., a second fabric layer) attached to the first layer 910 at an outer circumference to form an inflatable chamber 925 between the first layer 910 and the second layer 920. For example, the layers may be attached using an adhesive, thermal joining (e.g., welding), mechanical attachment using, for example, clamps, etc., or any other attachment technique. In a more particular example, the layers may be laid-up as liquids and then solidified as a unitary solid.

A middle layer 930 is disposed between the first layer 910 and the second layer 920. The middle layer 930 may be configured such that the first layer 910 and the second layer 920 do not adhere to one another (for example, are free to separate when the chamber is inflated) in any location where the middle layer 930 is between the outer layers. In some embodiments, the middle layer 930 is a release agent such as, for example, a release spray. The middle layer 930 includes one or more voids 935 (holes) such that the first layer 910 and the second layer 920 are able to be attached to one another through the voids 935. In this way, channels 938 are formed in the inflatable chamber 925. In some embodiments, the first and second layers 910, 920 are trimmed at the void locations such that holes are formed through the robotic fabric 900 (see, for example, FIG. 13A).

Figure 8:
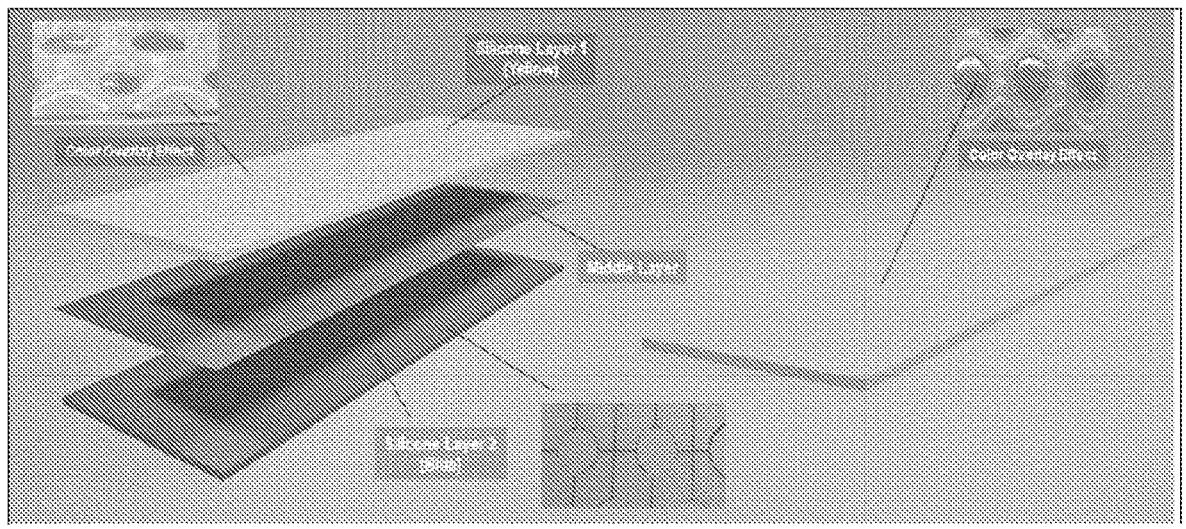
FIG. 8 illustrates an embodiment of a robotic fabric having a color changing effect ("Sample 1").
Figure 9:
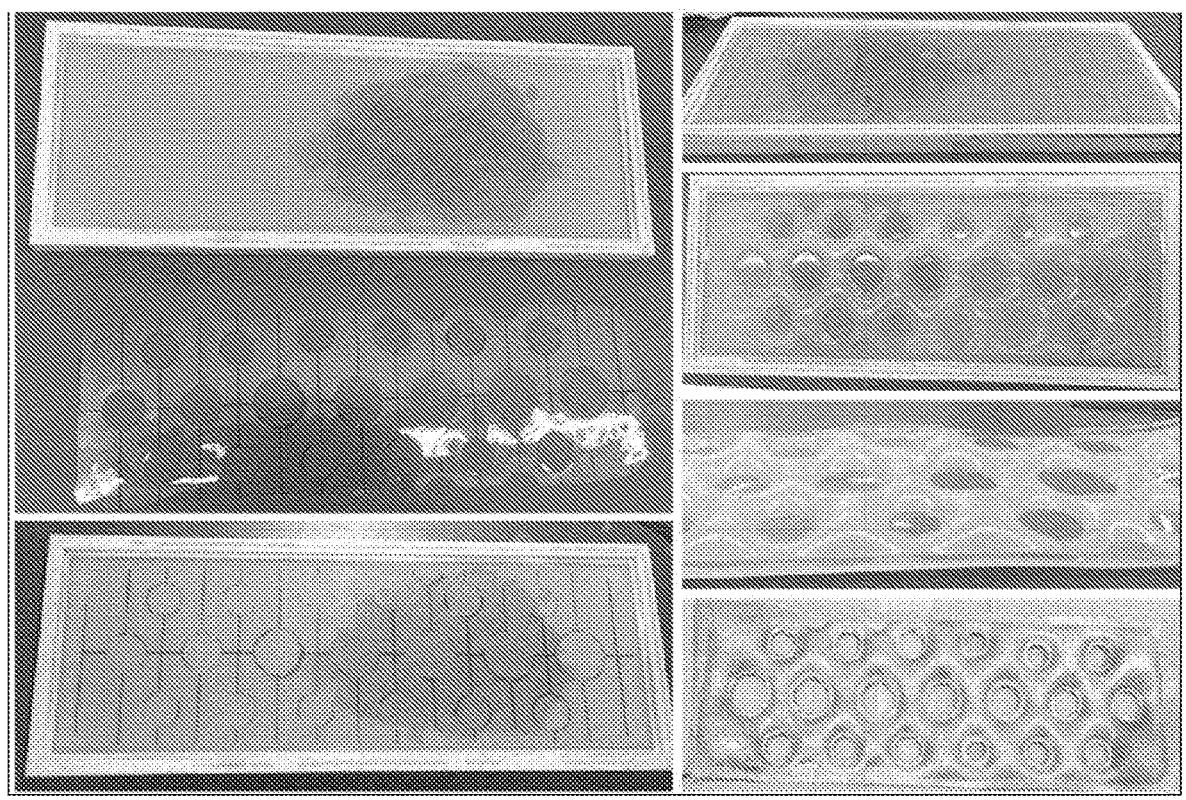
FIG. 9 depicts various images of Sample 1.

In an exemplary embodiment, FIG. 8 illustrates an exemplary embodiment of a robotic fabric having a color changing effect ("Sample 1"). Sample 1 is a composite structure with triple layers: two silicone layers (1 mm per-layer) for surface and one transparent plastic membrane in the middle. The middle layer comprises holes—areas where no middle layer material is present—where the first layer is in contact with the second layer. In this way, the structure is inflatable such that a fluid (e.g., air, water, etc.) can be introduced between the first and second layers. The middle layer was tailored by laser-cutting before pouring the silicone layers. As shown in FIG. 9, Sample 1 has seven large circular holes (20 mm) and twelve small circular holes (15 mm), which are isometric from each other. The middle layer prevents the two silicone layers from adhesion, and the shape of the middle layer determines the final shape of the air paths. The inflatable thickness of the robotic fabric may be influenced by the width of air paths. The holes provided may be through holes, extending through all three layers of the fabric. This arrangement provides breathability to the wearer. Alternatively, the holes may only be present in the middle layer, such that the top and bottom layers adhere to one another in the areas defined by the holes.

Sample 1 depicts an embodiment in which each silicone layer is a different color. For example, the upper layer may be yellow and the lower layer may be blue. Due to the semi-transparent property of the silicone layers, the structure shows green appearance before inflation. The two layers will separate after inflating and the color superposition effect reduces, thereby restoring the appearance of the structure to the original colors. This color variation may improve product appearance. In addition, this structure can add a surface coating, such as a surface metallic coating, for potential thermal insulation.

Figure 10A:
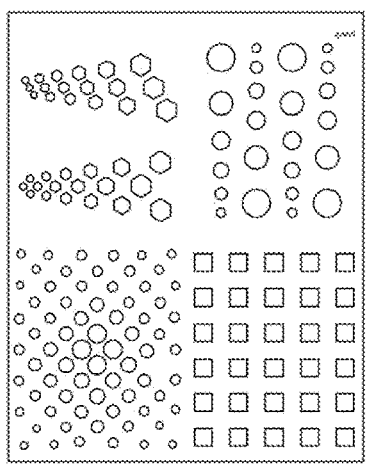
FIG. 10A is an illustration of several exemplary air path designs suitable for the present disclosure.
Figure 10B:
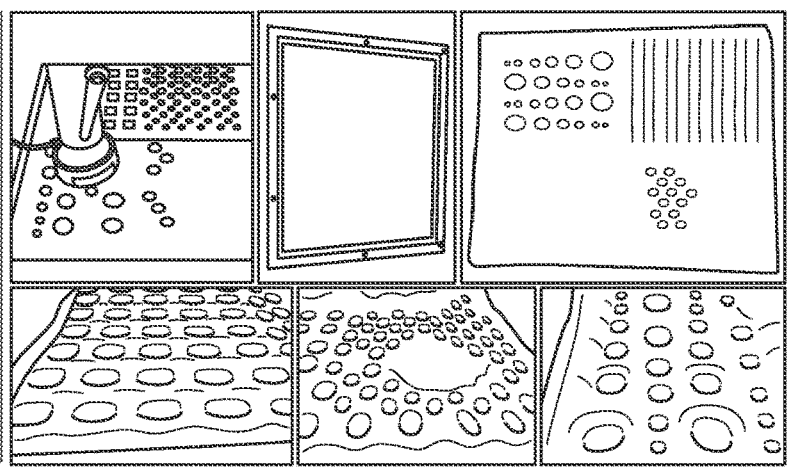
FIG. 10B depicts various embodiments of a robotic fabric ("Sample 2") having exemplary air path designs.
Figure 11:
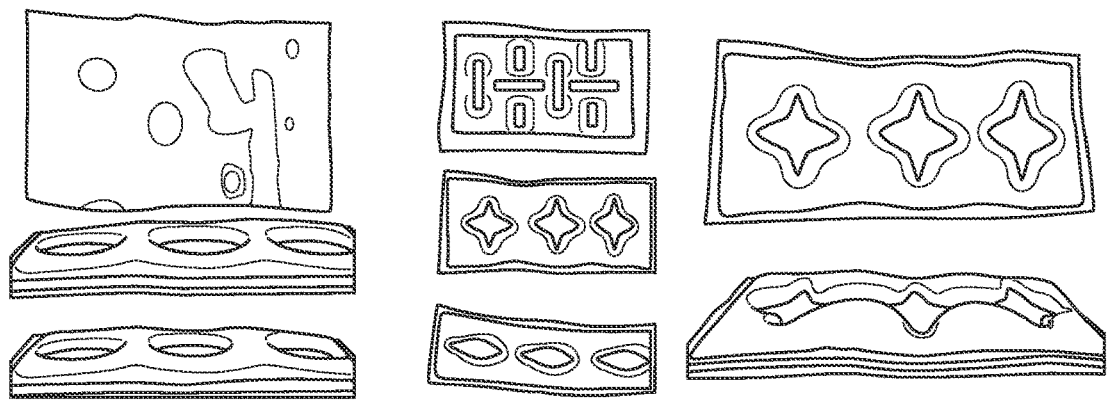
FIG. 11 depicts various embodiments of a robotic fabric ("Sample 3") having a release spray layer and exemplary air path designs before and after inflation.

FIG. 10A is an illustration of several exemplary air path designs suitable for the present disclosure. The air path designs are defined by the size, shape, and placement of holes in the inflatable structure. FIG. 10B depicts the testing of various embodiments of a robotic fabric ("Sample 2") having exemplary air path designs. Sample 2 tested three hole shapes, hexagon, circle, and square, to explore the inflation performance of obtuse angles, right angles, and curve edges. FIG. 11 further depicts embodiments having hole shapes with acute angles. The positioning of holes may be divided into isometric arrangement or asymptotic arrangement. In a particular arrangement, the diameter of the circles may decrease, but distance between the holes may increase gradually from center, simulating pores of human skin. The number and location of holes could be arranged according to a thermal map or a sweat map of the human body. According to the tests of Sample 2, a regular air path has good inflation preference. In the test embodiments, when the spacing between holes was less than 6.8 mm, air could not be filled into the composite structure. Also, inflation thickness may be inversely proportional to hole spacing.

Figure 12A:
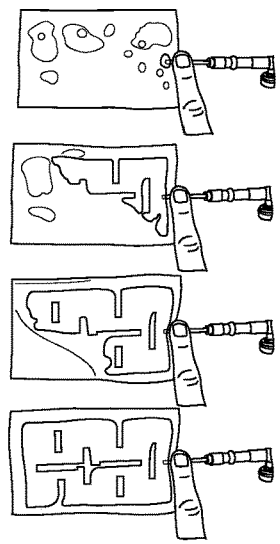
FIG. 12A depicts Sample 3 at stages during the air inflation process.
Figure 12B:
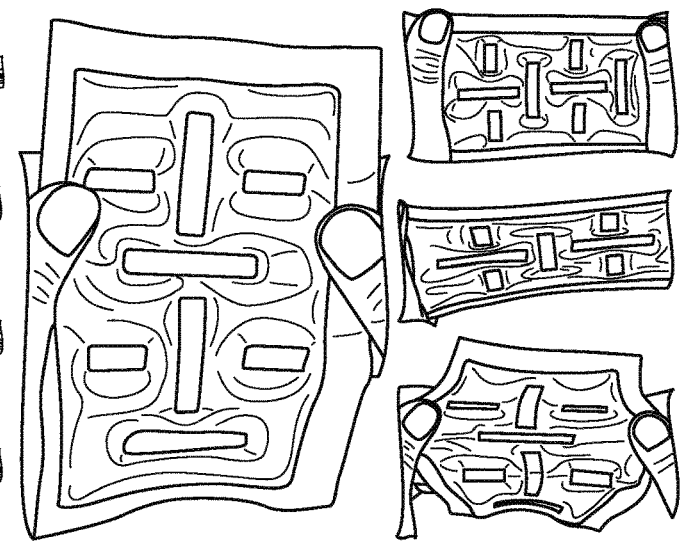
FIG. 12B depicts Sample 3 under various degrees of tensile stress.

FIG. 11 depicts various embodiments of a robotic fabric ("Sample 3") having a middle layer comprising or consisting of a release agent (or, a release spray layer instead of a middle layer). The release agent (release spray) may be, for example, Mann Ease Release 200 Aerosol Clear Mold Release Spray. Release agent middle layer is disposed (e.g., sprayed) on the first layer before pouring the second layer of silicone. The advantages of this method are to reduce or eliminate the binding force of the inelastic middle layer so that a final inflatable structure had good tensile properties, which also had a better tactile impression and drape property. FIG. 12B depicts Sample 3 under various degrees of tensile stress.

The present disclosure provides a method for manufacturing an embodiment of a robotic fabric. In an exemplary embodiment of the method:

Step 1: Surface laser cutting for mold fabrication. A laser cutting path is drawn on the acrylic mold's surface by surface laser cutting, which is used for the datum mark in follow-up cutting.

Figure 13A:
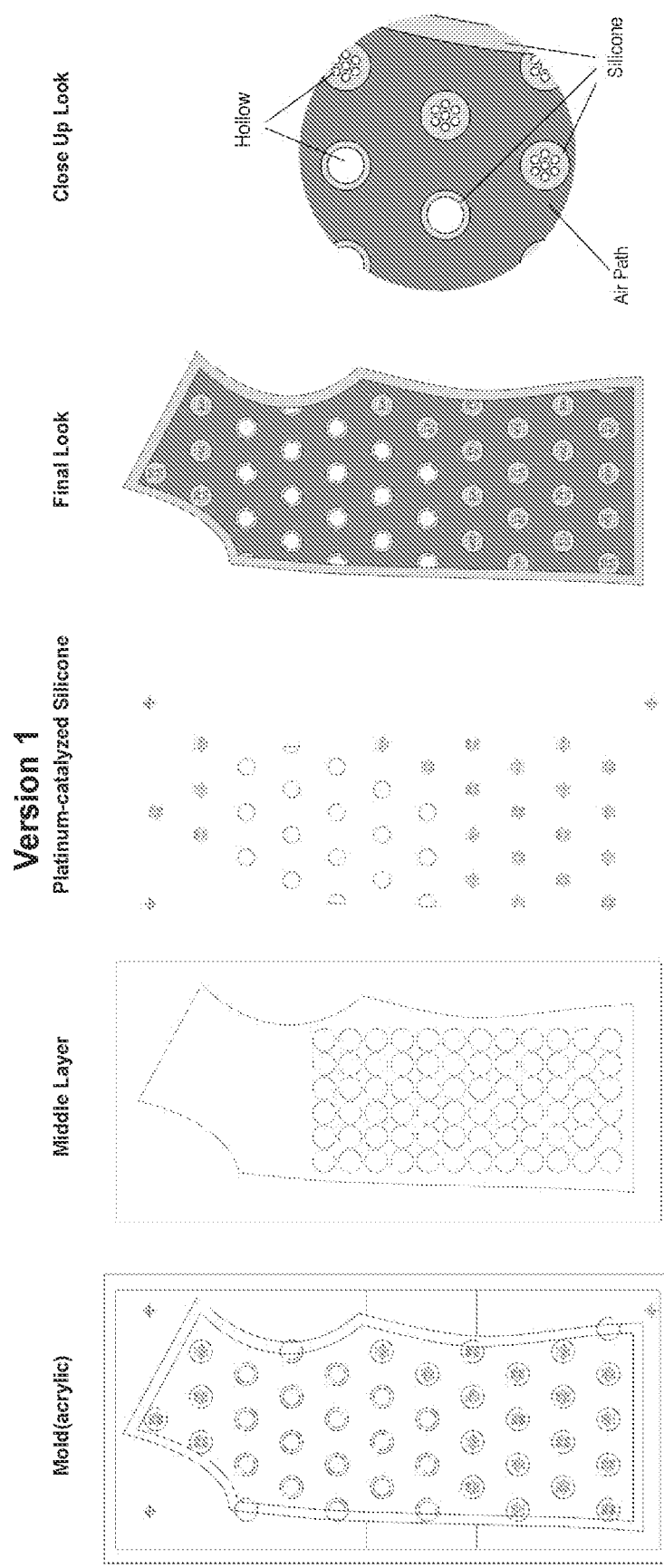
FIGS. 13A-C illustrate embodiments of a robotic fabric having various air path structures.
Figure 13B:
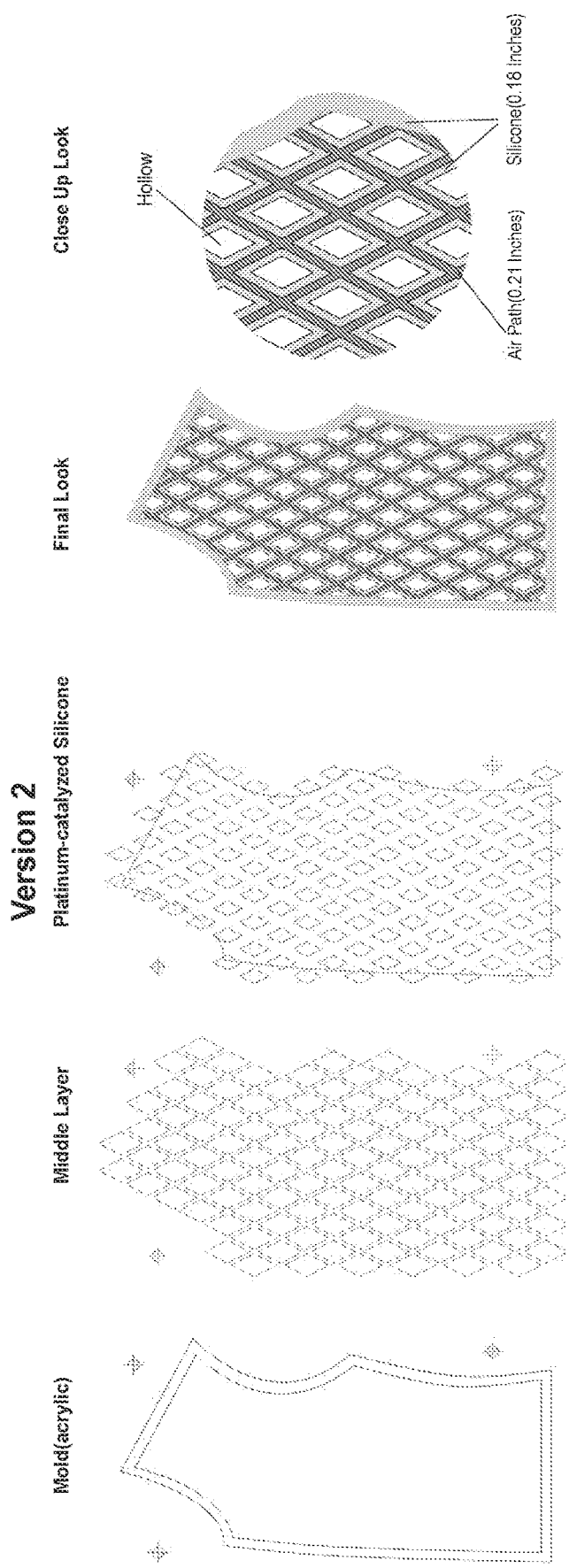
Figure 13C:
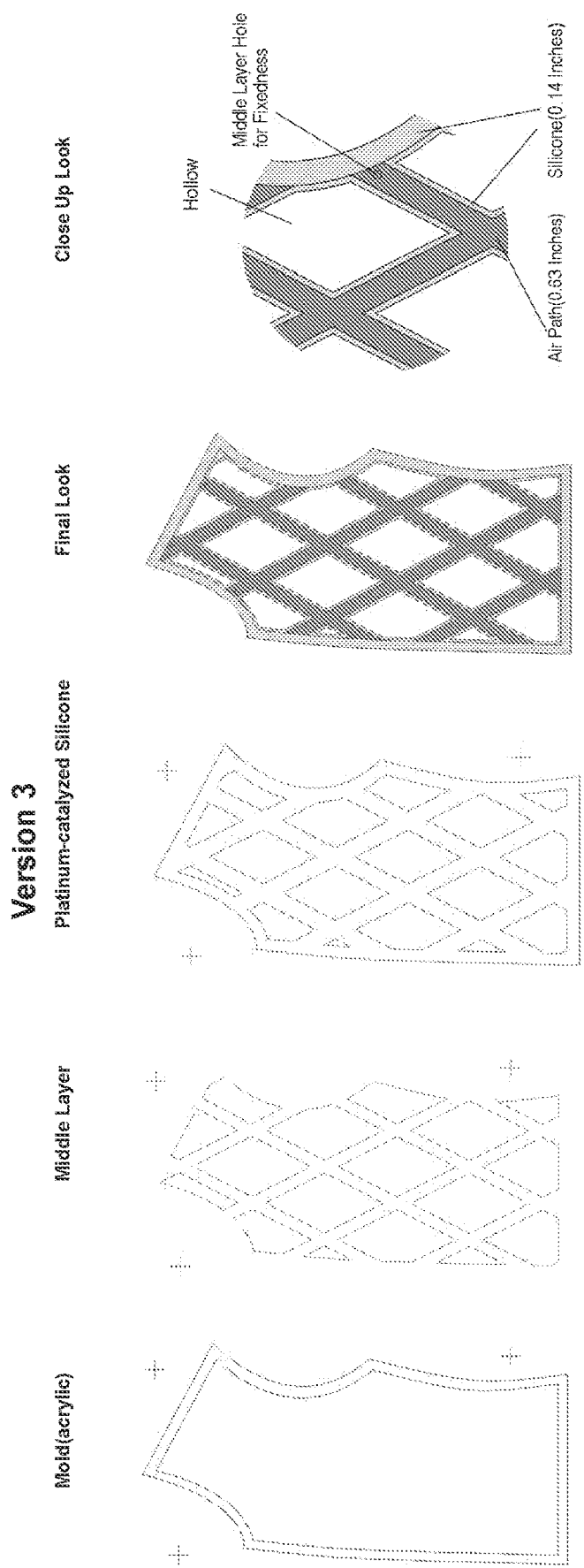
Figure 14:
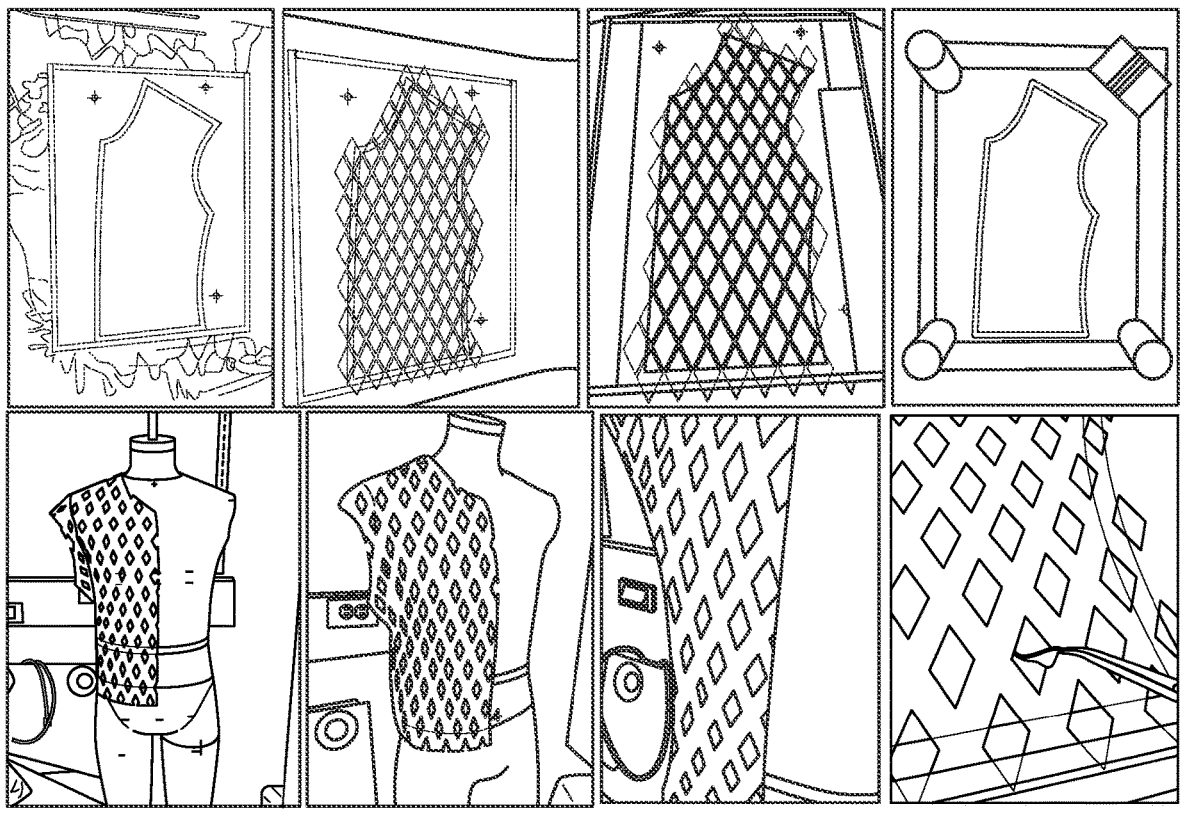
FIG. 14 depicts the embodiment of a robotic fabric shown in FIG. 13B at various manufacturing stages.

Step 2: Hollow out the middle layer. FIGS. 13A-C illustrate three design for the middle layer: dot hollowing, small diamond grid, and large diamond grid. Each design includes an area for air to pump in between the top layer and the middle layer, and a sewing allowance for adhering the top layer to the bottom layer. In test embodiments, a reliable spacing of at least 3 mm was advantageous between silicone layers and middle layer. However, other spacing may be appropriate depending on the application.

Step 3: First pouring for the bottom layer. The bottom layer of silicone is deposited (e.g., poured, etc.) into the mold. A silicone dye may be added for improved appearance. In order to get an equal deformation for both of the two silicone layers, it is necessary to ensure that each pouring uses same quality of silicone. If unilateral deformation is needed, the quality of one layer may be reduced, and the thinner layer will deform under same air pressure.

Step 4: Add the middle layer on bottom layer. In order to prevent the middle layer from moving inside the structure, the boundaries of plastic paper are trimmed to have rounded corners and small holes are added to the stationary middle layer. Due to silicone's own weight and good extension, it would stretch and deform vertically during dressing. However, the inelastic middle layer prevents vertical deformation in the inflatable material. The diamond grid structures shown in FIGS. 13B and 13C have a certain amount of the horizontal tensile allowance according to design preferences. The inflatable structure may be inelastic in the warp direction and elastic in the weft direction.

Step 5: Second pouring for top layer. The top layer of silicone is deposited on (e.g., poured over, etc.) the middle layer. A silicone dye may be added for improved appearance. A different color may be chosen for the top layer to provide a color changing effect when the fabric is inflated and deflated.

Step 6: Cutting (e.g., laser cutting, etc.) for whole structure. The cutting paths must not coincide with air path (middle layer). For precise alignment, crossovers (for example, three crossovers) may be added to calibrate the position of middle layer. With the help of an anchor point, cutting error can be controlled within 1 mm.

Figure 15:
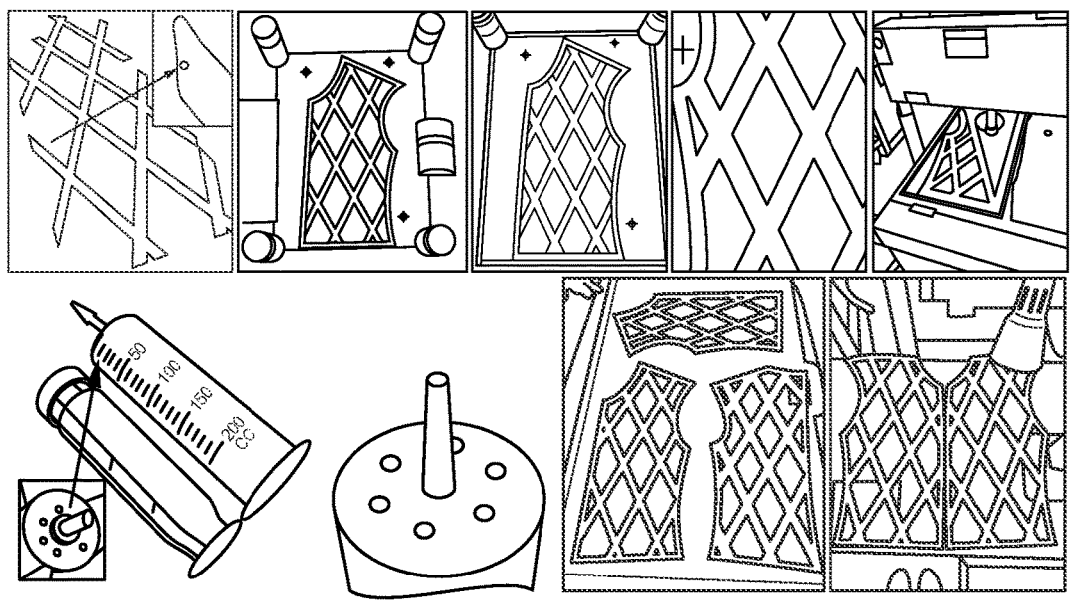
FIG. 15 depicts the embodiment of a robotic fabric shown in FIG. 13C at various manufacturing stages.
Figure 16:
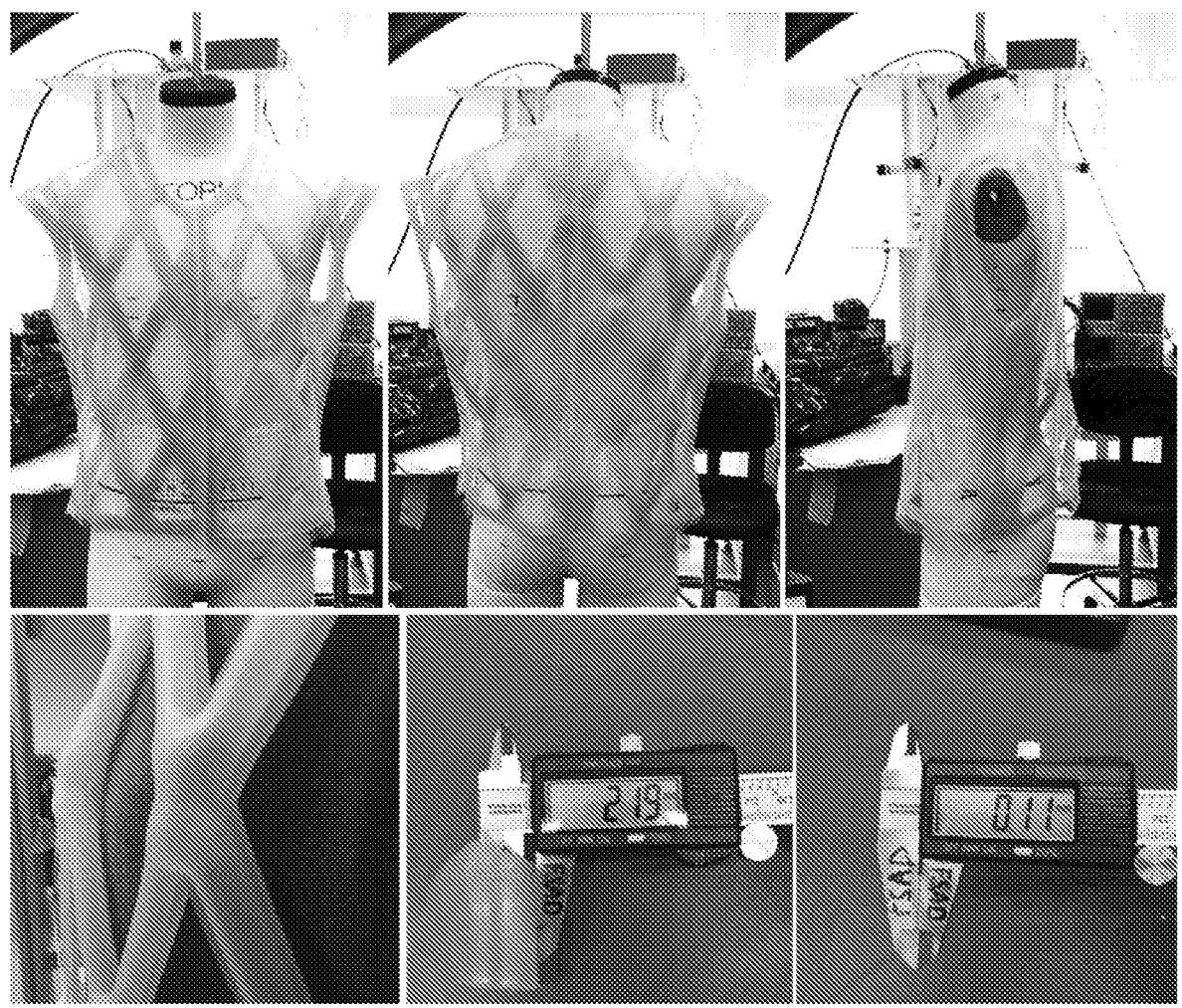
FIG. 16 depicts the embodiment of a robotic fabric shown in FIG. 13C before and after inflation.

During fabrication, it may be beneficial for the silicone liquid to be distributed evenly in mold during deposition (e.g., pouring) process. In some embodiments, it may be preferred that the silicone forms a 1 mm pure plane, so deposition tools may be very important. In a test embodiment, in order to make pouring more uniform, a reusable syringe with a large capacity of (e.g., 200 ml) was modified such that the original outlet was sealed and six holes with diameter of 3 mm are added at the top of needle pipe as shown in FIG. 15. Because of the viscosity of silicone, the diameters of the holes should not be too small. If the holes are too small, solution cannot be extruded, while if they are too large, the unit extrusion is too large, which is not conducive to uniform pouring. In a particular embodiment, the holes may have a diameter of 3 mm for uniform pouring. After the inflatable structure is completed, it could be used as a windproof inner liner. The total thickness of an exemplary inflatable structure was approximately 2.2 mm before inflating, and was able to provide 10 times deformation thickness after inflating (not overloading), although other thicknesses before and after inflation may be used.

The robotic fabric according to embodiments of the present disclosure may exhibit improved elasticity. Soft silicone has low viscosity, which allows for a relatively thin film (as thin as <1 mm each layer) during pouring. Also, the structure can rebound to original form without distortion after stretching multiple times. The structure may be breathable due to large area of holes hollowed out by a laser cutting machine. Furthermore, thickness of this structure is similar to the ordinary plain-knitted fabrics, which do not make wearers feel bloated or occupy too much space. In addition, easy-to-clean materials (for example, silicone) may be used for the structure. Laser cutting technology may be used to cut materials according to a preprogrammed cutting path ensures fabrication process accurately and precisely.

In comparison to existing smart fabrics, robotic fabrics according to embodiments of the present disclosure may be environmentally-friendly, cost-effective, easy to mass produce, actively controllable, and may have advantageous mechanical properties. It may be desirable to minimize the size of the actuator(s) and to minimize the impact on clothing appearance and comfort.

Embodiments of the present disclosure may be used to replace down feather and other thermal filling materials and widen the scope of thermal insulation materials. The use of green cleaning materials reduces the use of down feather and wool, therefore is environmentally friendly without pollution. It overcomes the airtight shortcomings of original inflatable clothing and improves comfort for the wearer. Silicone layers with different hardness and/or thicknesses can be used to design a variety of inflatable structures with multiple deformations, which could be used for different applications, such as soft skeletal structures, pneumatic control devices, soft actuators for human body control, and use in the field of lifesaving.

Although the present disclosure has been described with respect to one or more particular embodiments, it will be understood that other embodiments of the present disclosure may be made without departing from the spirit and scope of the present disclosure.

We claim:

1. A robotic fabric, comprising:
a first fabric layer;
an actuator comprising a first state and a second state, wherein a property of the first fabric layer is different when the actuator is in the first state as compared to the property of the first fabric layer when the actuator is in the second state;
wherein the first fabric layer comprises one or more pores having a first size when the actuator is in the first state, and wherein the pores have a second size when the actuator is in the second state;

wherein the actuator is actuated by adding or removing fluid from an interior chamber of the actuator; and wherein the actuator is disposed around the circumference of each pore, and the actuator has a first curvature when in the first state and a second curvature, which is less than the first curvature, when in the second state, and wherein the size of each pore is increased as the curvature of the actuator decreases.

2. The robotic fabric of claim 1, further comprising a second fabric layer, and wherein the actuator is disposed between the first fabric layer and the second fabric layer.

3. The robotic fabric of claim 2, wherein the actuator is configured to alter a distance between the first fabric layer and the second fabric layer.

4. The robotic fabric of claim 1, wherein the fluid is a gas; and further comprising a blower for adding or removing gas from the actuator.

5. The robotic fabric of claim 1, wherein at least a portion of the actuator has a first thickness when in the first state and a second thickness when in the second state.

6. The robotic fabric of claim 1, further comprising a sensor, and wherein the actuator is in the first state or the second state based on a signal from the sensor.

7. The robotic fabric of claim 6, wherein the sensor is configured to measure temperature and/or humidity.

8. The robotic fabric of claim 1, wherein the pore size is between 0 and 1 mm when in the first state and between 0.1 mm and 50 mm when in the second state.

9. The robotic fabric of claim 2, wherein the distance between the first fabric layer and the second fabric layer is between 0 mm and 10 mm when in the first state and between 0.5 mm and 100 mm when in the second state.

10. A robotic fabric, comprising:
a first fabric layer;
an actuator comprising a first state and a second state,
wherein a property of the first fabric layer is different when the actuator is in the first state as compared to the property of the first fabric layer when the actuator is in the second state;
wherein the first fabric layer comprises one or more pores having a first size when the actuator is in the first state, and wherein the pores have a second size when the actuator is in the second state;
wherein the actuator is actuated by adding or removing fluid from an interior chamber of the actuator; and
wherein the actuator comprises a first actuator disposed around a first portion of the circumference of each pore and a second actuator disposed around a second portion of the circumference of each pore, wherein the first actuator and/or the second actuator has a first curvature when in the first state and a second curvature in the second state, wherein the second curvature is greater than the first curvature, and wherein the size of each pore is increased when the first actuator and/or the second actuator are actuated to transition from the first state to the second state.

11. The robotic fabric of claim 10, further comprising a second fabric layer, and wherein the actuator is disposed between the first fabric layer and the second fabric layer.

12. The robotic fabric of claim 10, wherein the fluid is a gas; and further comprising a blower for adding or removing gas from the actuator.

13. The robotic fabric of claim 1, wherein at least a portion of the actuator has a first curvature between 0 and 20 (1/m) when in the first state and a second curvature between 0.0001 and 1,000 (1/m) when in the second state.

* * * * *